United States Patent [19]

Harvey

[11] Patent Number: 4,460,828

[45] Date of Patent: Jul. 17, 1984

[54] FLUORESCENCE QUENCHING TECHNIQUE FOR SCANNING VISUAL SYSTEMS

[75] Inventor: James F. Harvey, Maitland, Fla.

[73] Assignee: The United States of America as represented by the Secretary of the Navy, Washington, D.C.

[21] Appl. No.: 373,756

[22] Filed: Apr. 30, 1982

[51] Int. Cl.³ .............................................. G03B 21/00
[52] U.S. Cl. ................................. 250/329; 250/461.1
[58] Field of Search .................. 250/271, 329, 461 R; 434/43, 44; 358/87, 104

[56] References Cited

U.S. PATENT DOCUMENTS

| | | | |
|---|---|---|---|
| 2,996,617 | 8/1961 | Heckscher | 250/329 |
| 3,133,194 | 5/1964 | Watson et al. | 250/329 |
| 3,927,323 | 12/1975 | Koloc | 250/329 |
| 4,100,571 | 7/1978 | Dykes et al. | 358/87 |

Primary Examiner—Janice A. Howell
Attorney, Agent, or Firm—Robert F. Beers; Robert W. Adams

[57] ABSTRACT

By using a fluorescer on the viewing surface of a visual screen and illuminating the screen with ultra-violet light, a bright display of the scene is achieved when the laser scan system is operated in the negative mode to quench the fluorescence at spots on the screen that correspond to darker areas in the scene.

11 Claims, 1 Drawing Figure

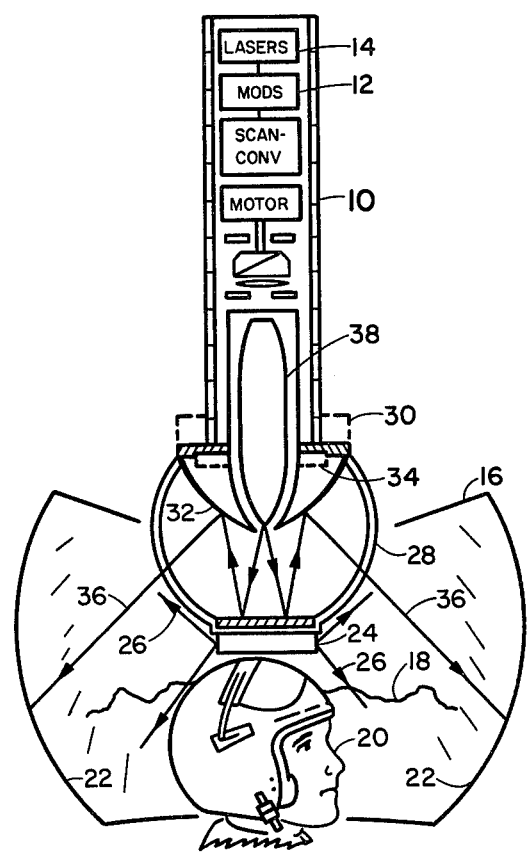

FLUORESCENCE QUENCHING TECHNIQUE FOR SCANNING VISUAL SYSTEMS

BACKGROUND OF THE INVENTION

The present invention relates to the field of visual displays. More specifically, the present invention pertains to laser scan systems designed for visual display of scenes photographed or generated, up to and including real-time systems.

The lasers' high intensity, coherence and bandwidth make possible many new applications of laser light. When used in a scanning system for visual display of a scene, the laser has been precluded by inherent characteristics of the display system from providing a visual presentation that is of sufficient brightness to rival that of a cathode ray tube. Where a cathode ray tube has phosphors that contribute the persistence so well adapted for a scanning system, the display systems used with the laser scanning technique do not. This inability to rely on phosphorescence to extend the time an image exists with laser displays is a serious disadvantage to screen brightness. Coupled with the inefficiency of lasers, the lack of persistence causes laser displays to be very inefficient in energy terms, especially for large laser displays such as are found in simulator devices.

The result is that present laser scanning display systems are not fully acceptable or satisfactory for application where a bright image is required or desired. The present invention overcomes the deficiency by adapting the laser scanning display system to provide a bright screen for the image(s).

SUMMARY OF THE INVENTION

The present invention is a means and method to increase the brightness of a scanning system display. The system includes means to adapt the screen of such a display with a material that will fluoresce when illuminated by ultra-violet light, and means to illuminate the screen with ultra-violet light. Also included are means to adapt the scanning system to scan a negative of the desired image with infrared light. Inasmuch as infrared light quenches fluorescence generated by ultraviolet light, the resultant display is a positive image.

Brightness is enhanced by employing the natural glow of fluorescence as a substitute for increased laser intensity. The portions that are permitted to remain fluorescent form the positive image. They are brighter and therefore more acceptable and satisfactory as a display, particularly where large scale display systems are used or needed. Advantages include increased efficiency, especially with respect to the use of energy. And, where laser scanning is employed, the present invention eliminates the laser speckle problem that has been debilitating to visual lasers, and provides a viable alternative to the highly inefficient red and blue components in a color system.

BRIEF DESCRIPTION OF THE DRAWING

The FIGURE is a pictorial view of a laser scanning display system showing a preferred embodiment of the present invention in a 360° display system, with two alternative placements of the ultra-violet illumination means also shown.

DESCRIPTION OF A PREFERRED EMBODIMENT

The present invention adapts scanning visual systems to enhance the intensity of the displayed image in order to provide a brighter and therefore more usable display system, and to provide other advantages expressed herein. The present invention has broad application and may be adapted to all scanning display systems of the projection type, such as laser visual systems. The advantages afforded by the present invention are most noteworthy when the means and method disclosed herein are applied to large scale visual systems, such as are utilized in military and commercial simulator training devices.

The FIGURE shows an embodiment of the present invention in the 360° Non-Programmed Visual System of U.S. Pat. No. 4,100,571 by Wiley V. Dykes et al and assigned to the United States of America as represented by the Secretary of the Navy.

Laser scanning system 10 is substantially as disclosed in the patent identified immediately above, but for modification to modulators 12 and, if necessary, modification to lasers 14. Likewise, display screen 16 is substantially as disclosed in the patent but for modification that will be described below. The pictorial representation, or image, 18 will remain a positive image for observer 20 in accordance with the present invention. The difference that is easily identifiable by observer 20 between the patented system, and the patented system as adapted by the present invention, is that image 18 provided by the latter is substantially brighter.

The adaptation to which the present invention is directed employs three parts. The first is an adaptation of screen 16 to render surface 22 responsive to ultra-violet illumination. The desired response is for surface 22 to fluoresce when illuminated by ultra-violet light. This response may be achieved by coating the inner surface of screen 16 with a fluorescent paint, by treating surface 22 with a whitener commonly used in laundry products, or by otherwise impregnating screen 16 by treatment with a fluorescent material during or after manufacture of screen 16.

The second part of the adaptation pertains to illuminating screen 16, so as to cause surface 22 to fluoresce. Provided for the purpose is source 24 that is included in the present invention to illuminate surface 22 with ultraviolet light. Any of the available ultra-violet sources may be employed that provide or can be made to provide wide-angle illumination 26 that is substantially uniform throughout the vertical angle that corresponds to illuminating surface 22 over all of the 360° of the viewing screen. The placement shown in the FIGURE of source 24 would require a self-contained power source, or power leads on or within dome 28. Such leads would appear as stationary shadows in the display on screen 16. To do away with the shadows, the leads may be eliminated by placing source 24 in the alternative positions shown in the FIGURE. Placement 30 may be used for source 24 above dome 28, or, if a one-way mirror is suitable for use as mirror 32, source 24 may be positioned at placement 34. In either case, source 24 should be annular and be made to evenly radiate ultra-violet illumination to surface 22.

As another alternative to the placement of source 24, a user should consider positioning source 24 outside the visual system shown. For that arrangement, screen 16 would need to be transparent or translucent to ultra-violet light. Source 24 in the form of a plurality of radiating sources would be arranged to backlight screen 16 from outside the viewing arena occupied by observer 20. Observer 20 would still experience the fluorescent advantages of the present invention.

The third part of the adaptation pertains to scanning beam 36, and relates to lasers 14 and modulator 12. Infrared light will quench the fluorescence generated by ultra-violet source 24. By scanning a negative image of pictorial representation 18 with an infrared laser, a positive image of pictorial representation 18 formed by fluorescent portions will be visible to observer 20. Accordingly, scanning system 10 is adapted to provide a negative scanned image of infrared light by substituting an infrared laser for lasers 14, and by reversing modulators 12 to provide a negative scan of the image to be viewed. Infared lasers that may be adopted for the present invention are commercially available. Any of such lasers may be substituted for the laser otherwise used. If the original laser is an infrared laser or the system can be modified to provide infrared light from the original laser, substitution will not be necessary. Modification of modulators 12 is intended to be performed in accordance with presently available techniques to achieve the intended result. Obvious alternatives are, of course, permissible to provide the desired negative scan.

While the present invention has been described in terms of a specific laser scanning system, it is to be understood that the present invention has application to other laser scanning systems, and to other scanning systems such as television projection scanners.

In operation of the embodiment specifically described herein, image information is coupled to system 10 for viewing by observer 20 on screen 16. Laser light is provided by laser 14 and modulated by adapted modulator 12 to provide a negative scan of the image in beam 36 from optics 38. Beam 36 is of infrared light. Screen 16 is illuminated by ultraviolet source 24 and includes surface 22 which is adapted to fluoresce in ultra-violet light. The fluorescent glow of surface 22 is selectively quenched by beam 36 scanning in a negative mode to form positive pictorial representation 18 of the image. The result is, observer 20 views an image enhanced by the fluorescent characteristics associated with the present invention.

Obviously many modifications and variations of the present invention are possible in the light of the above teachings. It is, therefore, to be understood that within the scope of the appended claims the invention may be practiced otherwise than as specifically described.

What is claimed is:

1. An improvement in scanning display systems to increase brightness in the display, wherein said systems include a screen for presenting a scanned image and a projection system providing said scanned image, comprising:

means for illuminating said screen with ultra-violet light;
 means associated with said screen that is responsive to said ultra-violet illumination for fluorescing under illumination by said ultra-violet light means; and
 means associated with said projecting system for adapting said projecting system to scan said image onto said screen in a negative mode with infrared light;
 wherein said fluorescence is selectively quenched by said scanned image at portions on said screen corresponding to darker portions of said image and the brightness of other portions of said image is enhanced by said fluorescence, such that a bright display of a positive image is provided.

2. The system of claim 1 wherein said ultra-violet means provides continuous, substantially uniform illumination onto said screen.

3. The system of claim 1 wherein said responsive means associated with said screen is material applied to the surface of said screen.

4. The system of claim 1 wherein said screen is impregnated with said responsive means.

5. The system of claim 1 wherein said display system is a laser scanning display system and said laser is adapted to provide infrared light.

6. The system of claim 5 wherein said laser scanning display system is a 360° display system.

7. The system of claim 6 wherein said projection system has a major axis and said ultra-violet means has an axis that coincides with said major axis.

8. The system of claim 7 wherein said ultra-violet means is annularly concentric with said major axis of said projection system.

9. The system of claim 6 wherein said ultra-violet means is disposed opposite said screen from said projection system, and said screen is translucent, such that to an observer of said image from the projection system side of said screen, said screen is backlighted by said ultra-violet illumination.

10. A method for increasing the brightness of a scanning display system, wherein said display system includes a projection system providing an image by scanning technique and a screen spaced from said projection system for displaying said image, comprising the steps of:

adapting said screen to fluoresce when illuminated by ultraviolet light;
 illuminating said screen with ultra-violet light; and
 adapting said projection system to scan a negative of said image in infrared light;
 whereby said negative scanned image selectively quenches said fluorescence at portions on said screen corresponding to darker portions of said image and the brightness of other portions of said image is enhanced on said screen by said fluorescence, such that a bright display of a positive image is provided.

11. A scanned image visual display apparatus providing an especially bright picture for an observer by adopting the natural fluorescence qualities of certain materials when they are illuminated with ultraviolet light, and the fluorescence quenching feature of infrared radiation, comprising:

a display surface for providing a visual display of a scanned image, and being fluorescence responsive to ultraviolet illumination;
 an ultraviolet illumination means for uniformly irradiating said surface to activate said fluorescence such that said surface provides a bright visual screen to said observer;
 an image source;
 a scanning infrared projection means coupled to said source and modulated to present the optical negative of said image onto said surface for selectively quenching said fluorescence in a pattern corresponding to the levels of intensity in the optical positive of said image, such that a brightness enhanced optical positive of said image is presented to said observer.

* * * * *